United States Patent

Jones

[15] 3,659,562

[45] May 2, 1972

[54] AIR COOLING SYSTEM FOR ROTARY INTERNAL COMBUSTION ENGINE

[72] Inventor: Charles Jones, Hillsdale, N.J.

[73] Assignee: Curtiss-Wright Corporation

[22] Filed: Jan. 27, 1971

[21] Appl. No.: 110,104

[52] U.S. Cl..................123/8.01, 123/41.33, 123/41.57, 418/85

[51] Int. Cl..........................F01p 7/10, F01p 1/00

[58] Field of Search..............123/8.01, 41.57, 41.58, 41.65, 123/41.33; 418/85, 101

[56] References Cited

UNITED STATES PATENTS

| | | | |
|---|---|---|---|
| 2,206,418 | 7/1940 | Mercier | 123/41.33 |
| 3,196,850 | 7/1965 | Jones | 418/101 X |
| 3,261,335 | 7/1966 | Zimmermann | 418/85 X |

Primary Examiner—William E. Wayner
Attorney—Victor D. Behn and Arthur Frederick

[57] ABSTRACT

The air cooling system for a rotary piston, internal combustion engine, having a liquid cooled rotor and means defining a divided circumferential external cooling air flow path for flowing air in a first path adjacent the combustion and expansion sectors of the engine and cooling air in the second path adjacent the intake sector of the engine, comprises a liquid heat exchanger secured adjacent the intake sector of the engine and in the second external cooling air flow path so that heated liquid from the engine rotor is passed in indirect heat exchange relation to cooling air flowing through the second path. The heat exchanger is constructed and arranged to provide a pressure drop in the cooling air flow, downstream from the point of divergence of the cooling air flow, to automatically meter a smaller quantity of the cooling air flow in the second flow path than through the first flow path.

10 Claims, 5 Drawing Figures

Patented May 2, 1972

INVENTOR.
CHARLES JONES
BY
*Arthur Frederick*
ATTORNEY

INVENTOR.
CHARLES JONES

INVENTOR.
CHARLES JONES
BY
Arthur Frederick
ATTORNEY

AIR COOLING SYSTEM FOR ROTARY INTERNAL COMBUSTION ENGINE

This invention relates to rotary internal combustion engines and, more particularly, to the air cooling of such engines.

BACKGROUND OF THE INVENTION

Rotary internal combustion engines, such as the type disclosed in U.S. Pat. No. 2,988,065 which issued to Felix Wankel et al., pose unique cooling problems because of the non-uniform heating of the engine. As is fully explained in the U.S. patents to Jones U.S. Pat. No. 3,196,850, Jones U.S. Pat. No. 3,196,855, and Gist et al., U.S. Pat. No. 3,102,516, the outer body of the engine has a high degree of heat flux produced in the region of combustion and expansion (the region adjacent the ignition means and the following area in relation to the direction of rotor rotation) and low degree of heat input in the region of the intake working chamber into which fuel and/or air enters the chamber. This non-uniform heat flux subjects the engine housing or outer body to higher than desirable temperatures and non-uniform circumferential thermal stresses. It is, therefore, essential to minimize these temperature levels and thermal stresses by an air cooling system which has a high cooling efficiency in order that the power utilized to drive the cooling system imposes a minimal horsepower drain on the engine. In the rotary engine cooling systems, such as disclosed in the aforesaid U. S. patents to Jones wherein cooling air flow is split into two circumferential, external flow paths around the outer surfaces of the engine, it is desirable for optimum efficiency to match the volume and velocity of air flow to the heat loads in each of the two flow paths. Obviously, the sector of the engine, where combustion and expansion always occur, requires a much greater mass flow of air than the intake sector or region of the engine.

Also, in air cooled, rotary, internal combustion engines of this type wherein oil is employed both as a lubricant and rotor coolant, means for cooling and recirculating the oil must be provided. One such means is exemplified in the U.S. patent to Hans-Georg Zimmermann, U.S. Pat. No. 3,261,335, which provides an oil cooler adjacent the engine intake sector and integral with the engine outer body. The axial flow of cooling air through the oil cooler is regulated to provide less air flow through the oil cooler than through the combustion and expansion sector of the engine by providing more restrictive cooling air channels than are provided at the combustion and expansion sector.

The principal purpose of the present invention is to provide for a rotary internal combustion engine, an improved air cooling system which automatically meters the air to an oil cooler located in the region of working chamber intake and to the combustion and expansion region of the engine.

A feature of this invention is the disposition, in an air cooled, rotary piston, internal combustion engine having a split circumferential cooling air flow pattern, of an air cooled oil cooler adjacent the combustion air intake sector of the engine and the metering of the portion of the total cooling air flow across the oil cooler solely by pressure drop created downstream from the point of divergence of the main air stream.

SUMMARY OF THE INVENTION

Accordingly, the present invention contemplates an improved air cooling system for a rotary piston, internal combustion engine which, in combination, with a means forming a split, circumferential cooling air flow adjacent the outer body of the engine, comprises an oil cooler disposed adjacent the working chamber intake sector of the outer body and restricting means for restricting the flow of air downstream from the point of divergence of the main cooling air stream to thereby apportion the air flows across the oil cooler and combustion air intake sector of the engine and adjacent the combustion and expansion sectors in accordance with the cooling requirements of the respective sectors.

In a narrower aspect of the invention, it is contemplated that the restricting means include baffle means disposed adjacent the oil cooler and arranged to form a restricted cooling air outlet downstream from the oil cooler relative to the direction of cooling air flow. This location of a restricted opening provides for accelerated air flow velicities adjacent the oil cooler heat exchange elements and thus increases the rate of heat transfer for the mass flow of air.

DESCRIPTION OF THE DRAWINGS

The invention will be more fully understood from the following description when considered in connection with the accompanying drawings in which.

DESCRIPTION OF THE PREFERRED EMBODIMENT

Figure 1:
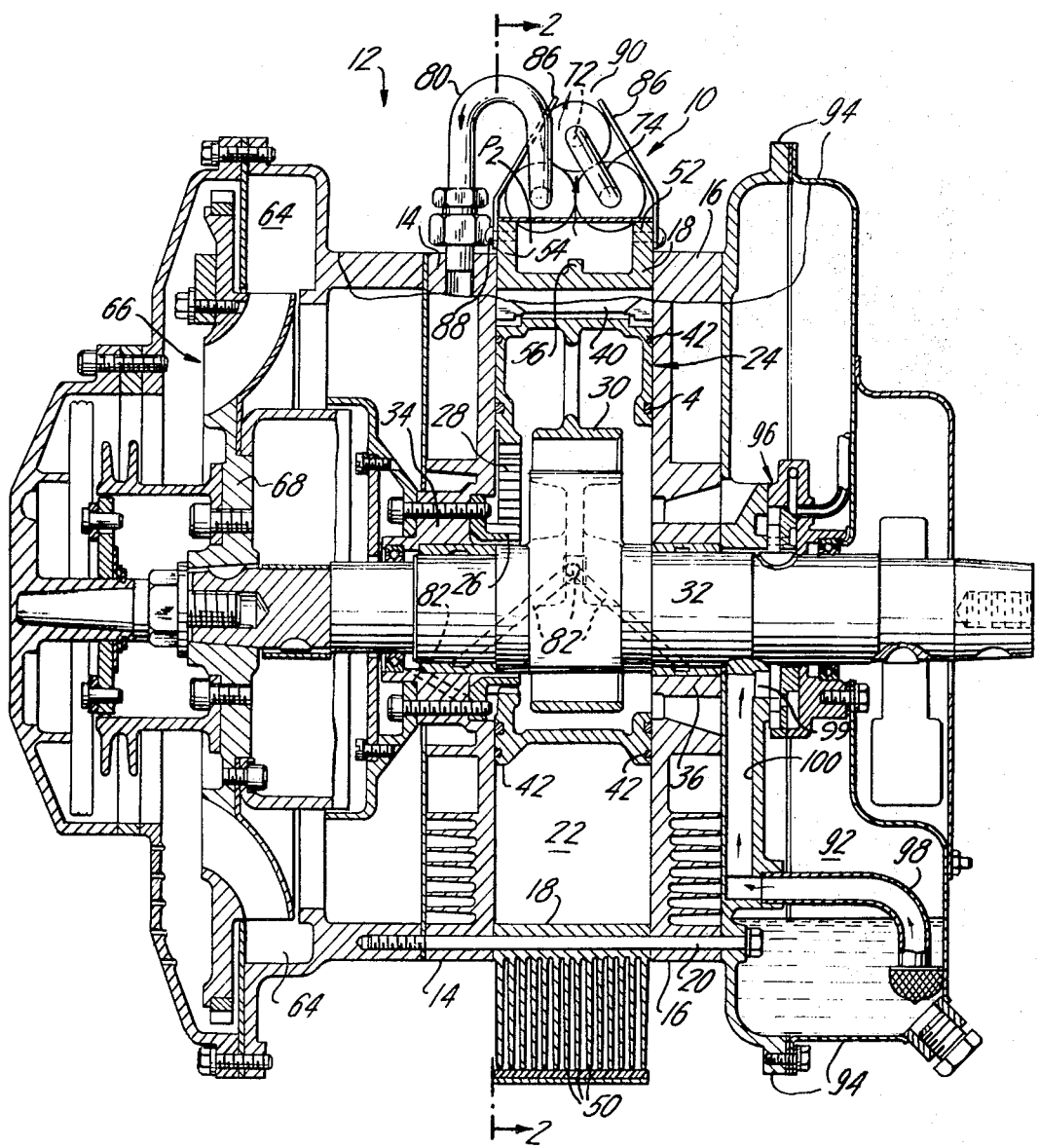
FIG. 1 is a longitudinal cross-sectional view of a rotary piston internal combustion engine having an air cooling system, including an air cooled oil cooler, according to the present invention taken substantially along line 1—1 of FIG. 2.
Figure 2:
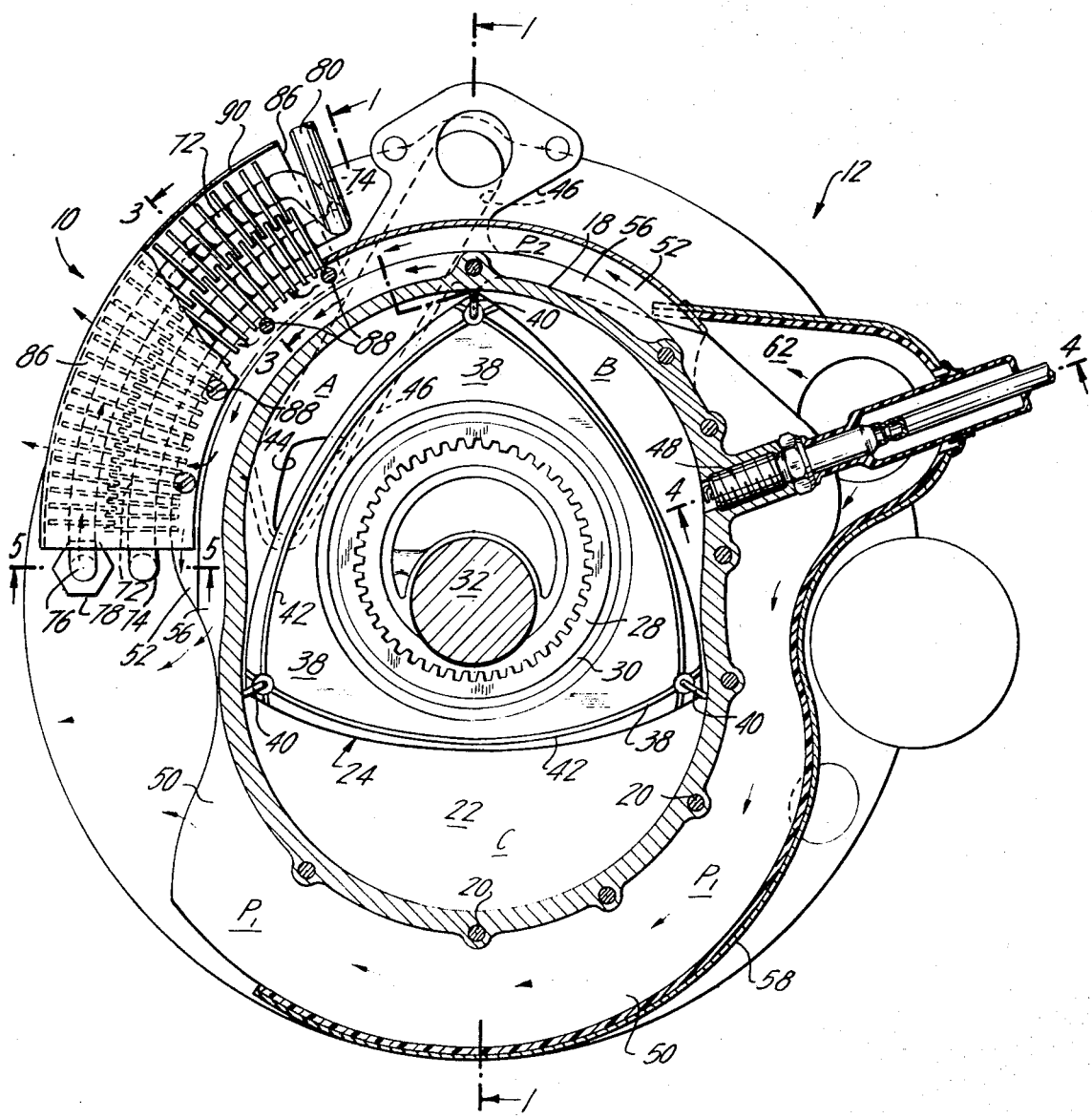
FIG. 2 is a sectional view taken substantially along line 2—2 of FIG. 1.

Now referring to the drawings and, more specifically, FIGS. 1 and 2, the reference number 10 generally designates an oil cooler which forms part of the improved air cooling system for a rotary piston, internal combustion engine 12, according to this invention.

The rotary piston, internal combustion engine 12 comprises a housing or outer body consisting of two end walls 14 and 16 axially spaced apart by a peripheral wall 18, the walls being secured together by a plurality of tie bolts 20 to define a piston cavity 22 of a basically double epitrochoidal configuration. A rotor 24 is supported for rotation in cavity 22 by a gear 26 secured in end wall 14 and eccentrically disposed relative to an internal ring gear 28 secured to rotor 24. The rotor 24 is connected at a hub portion 30 to a shaft 32 which is journaled for rotation in bearings 34 and 36 disposed in end walls 14 and 16, respectively. The rotor is generally triangular in shape and has three circumferentially spaced apex portions 38 (see FIG. 2). Each of the apex portions 38 have an apex seal 40 disposed therein to maintain a sealing contact with the peripheral wall 18 as rotor 24 rotates. The side walls of the rotor carry suitable end wall seals 42 (see FIG. 2) so that with apex seals 40 the rotor peripheral surfaces form with the outer body three substantially fluid tight working chambers A, B and C each of which successively expand and contract in volume as rotor 24 rotates.

As shown in FIG. 2, a working chamber intake port 44 is provided in end wall 16, which intake port connects with a feed pipe 46 and the working chamber A to pass air and/or fuel to the latter. A spark plug 48 or other ignition means is secured in peripheral wall 18 of the outer body to ignite the fuel and air mixture which is compressed after entry into cavity 22, by the continued rotation of the rotor. An exhaust port (not shown) is provided to communicate with chamber C to receive spent exhaust gases which, after combustion, expand to drive the rotor and are forced from cavity 22 upon further rotation of rotor 24. Since the combustion of fuel and the expansion of the combustion gases always occur in the same region of the engine, the outer body of the engine is heated to a substantially greater extent in the area generally encompassing chambers B and C than in the area generally encompassing chamber A. This uneven heating of the outer body or housing of the engine imposes high temperature levels and thermal stresses on the outer body which can be desirably minimized by specially designed cooling systems, such as disclosed in the U. S. patents to Jones, U.S. Pat. No. 3,196,850 and U.S. Pat. No. 3,196,855. The present invention provides a cooling system which achieves the minimization of operating temperatures and the thermal stress in the outer body of the engine by a combination of air and oil cooling in a unique manner more fully explained hereinafter.

Figure 3:
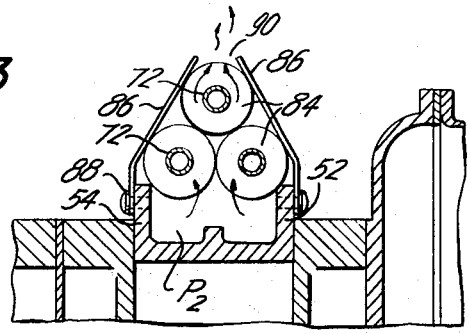
FIG. 3 is a fragmentary view in cross section taken along line 3—3 of FIG. 2.
Figure 5:
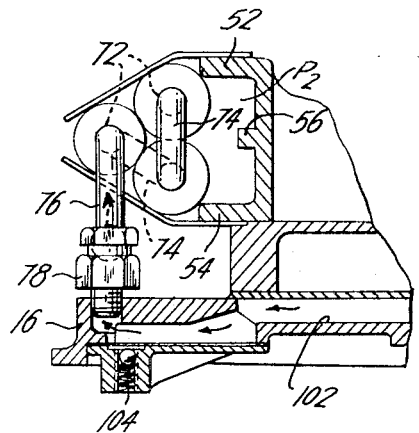
FIG. 5 is a fragmentary view in cross section taken along line 5—5 of FIG. 2.

A portion of the air cooling system comprises closed, spaced, parallel fin elements 50 which extend circumferentially around the outer body adjacent the combustion and expansion chambers B and C and are relatively large in size. The fins 50, as shown in FIG. 2, may be formed integral with peripheral wall 18. In the area of the outer body adjacent the intake, working chamber A, no fins are provided since the cooling requirements are considerably less than in the area of fins 50. Instead of fins, the outer body in the area of intake working chamber A is provided with two spaced arcuate mounting flanges 52 and 54 and a central reinforcing rib 56. The flanges 52 and 54 and rib 56 may be formed integrally with peripheral wall 18 as shown in FIGS. 1, 3 and 5. A baffle plate or cowling 58 is disposed to overlie the distal ends of fins 50, except adjacent the spark plug 48, to thereby form a plurality of air passageways between the adjacent fins, the plurality of passageways constitutes one air cooling flow path designated $P_1$. The cowling 58 also extends to overlie mounting flanges 52 and 54 to form with the flanges a second cooling air flow path designated $P_2$ (see FIGS. 1, 2 and 3). In the area of spark plug 48, cowling 58 is supported by the engine outer body in spaced relation to fins 50 to form a cooling air manifold chamber 62 which communicates with flow paths $P_1$ and $P_2$ to deliver cooling air to those flow paths.

Figure 4:
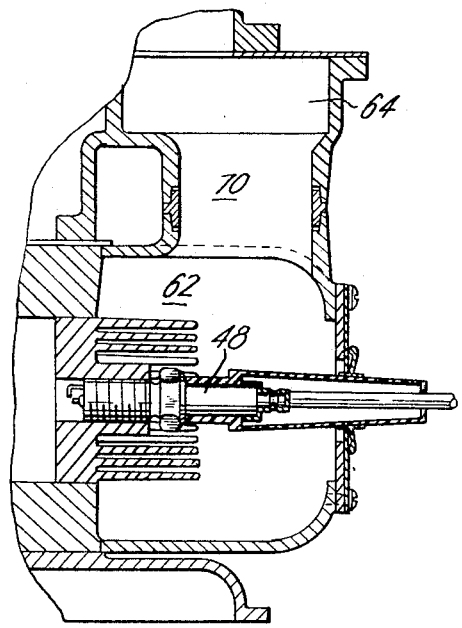
FIG. 4 is a fragmentary cross-sectional view taken along line 4—4 of FIG. 2.

Air for the flow paths $P_1$ and $P_2$ is supplied to manifold chamber 62 from the volute scroll shaped outlet 64 (see FIG. 4) of a blower 66 (FIG. 1), the impeller 68 of which is keyed to shaft 32 to be rotated by the latter. As best shown in FIG. 4, air from outlet 64 is discharged into mainfold chamber 62 through a connecting passageway 70. In addition to the cooling of the outer body of the engine by air flowing along flow paths $P_1$ and $P_2$, rotor 24 is cooled and lubricated by oil flowing therethrough. Since the oil is heated in contacting the rotor and other internal parts, it must be cooled before recirculation to the bearings and back through the rotor. In accordance with the present invention the oil is cooled in oil cooler 10 which is secured to the outer body or housing adjacent intake working chamber A (see FIG. 2).

The oil cooler 10 comprises a heat exchanger consisting of a plurality of concentric arcuate shaped tubes 72 interconnected by return bend portions 74 to provide for a series flow of oil through tubes 76. An inlet portion 76 (see FIGS. 2 and 5) is secured to outer body end wall 16 by a suitable connector 78, while a U-shaped outlet portion 80 is connected to end wall 14 (see FIG. 1) to pass cooled oil into bearings 34 and 36, rotor 24 and rotor hub 36 by suitable passageways (only some of which are shown at 82) in the engine assembly. Each of the tubes 72 are provided with a plurality of spaced, parallel, extended surface elements or fins 84. The tubes 72 are arranged in triangular configuration, when viewed in a transverse section through oil cooler 10. A baffle plate 86 is secured to each mounting flange 52 and 54 by suitable means such as a plurality of screws 88. Each baffle plate 86 is substantially coextensive with tubes 72 and has an offset portion which inclines toward the opposite baffle plate 86 to define at the distal end edge with the other baffle plate a relatively narrow elongated air outlet 90. The function of the restricted outlet 90 will be fully explained hereinafter.

The oil after lubricating the bearings 34 and 36, gears 26 and 28 and absorbing heat from rotor 24 and other internal components, flows into a reservoir or sump 92 which is formed in a housing attachment or extension 94 connected to end wall 16. From sump 92, the oil is circulated by a suitable pump 96, such as a gear pump driven by shaft 32 or other type pump well known to those skilled in the art, through an intake pipe 98 and suction passageway 100, to the pump inlet 99. As best illustrated in FIG. 5, the discharge or pressure side of pump 96 is connected to a discharge or outlet passageway 102 in end wall 16. The outlet passageway 102 communicates at its end, opposite from the pump discharge side, with inlet portion 76 of oil cooler 10 to pass the pressurized hot oil to the latter for flow through tubes 72. A pressure relief valve 104 is disposed in communication with outlet passageways 102 to relieve oil in the event an excess oil pressure condition develops. The heated oil, in flowing through tubes 72, passes in indirect heat exchange relation to the cooling air flowing from flow path $P_2$, between tubes 72 and through the restricted outlet 90 formed by baffle plates 86.

The restricted outlet 90, as well as fins 84 of oil cooler 10, are dimensioned to provide a back pressure on the flow of cooling air so that at divergence chamber 62 the air is split or divided in the proper proportion to provide the requisite flow of air commensurate with the heat flux along the respective flow paths $P_1$ and $P_2$. At the same time, the restricted outlet 90 provides adjacent tubes 72, increased air flow velocity thereby achieving a higher heat transfer rate, relative to the mass air flow, than would be achieved with a metering orifice or restriction upstream from the oil cooler with regard to cooling air flow, as for example, at the divergence chamber 62. This increased heat transfer efficiency permits the divergence of a greater flow of air through flow path $P_1$ where such cooling is most needed. Simultaneously, the system provides for cooling the lubricating oil which supplements the cooling effect achieved by air.

It is believed now readily apparent that the present invention provides an improved air cooling system for a rotary combustion engine having divided circumferential air flow paths, which system meters the air along the respective flow paths solely by a pressure drop through a heat exchanger located downstream from the point of divergence of the cooling air stream.

What is claimed is:

1. In an air cooling system for a rotary piston internal combustion engine having a liquid cooled rotor and means defining a divided, circumferential cooling air flow path for flowing air in one path adjacent the combustion and expansion sectors of the engine and in the other path adjacent the combustion intake sector of the engine, the combination comprising:
    a. the disposal of heat exchange means adjacent to the combustion intake sector of the engine, and in the said other cooling air flow path;
    b. said heat exchange means being constructed and arranged to receive heated liquid coolant from the engine and pass the same in indirect heat exchange relationship with the cooling air in said other flow path to cool the liquid coolant and discharge the cooled liquid coolant into the engine; and
    c. restricting means downstream in relation to the direction of cooling air flow from the point of divergence of the cooling air flow for providing a pressure drop in said other cooling air flow path to automatically meter a lesser mass flow of cooling air flowing in said other flow path than through the first flow path.

2. The apparatus of claim 1 wherein said restricting means includes baffle means.

3. The apparatus of claim 1 wherein said heat exchange means comprises a tubular means having extended surface elements.

4. The apparatus of claim 1 wherein said heat exchange means includes a tubular conduit means forming a plurality of substantially parallel passes interconnected to provide series flow of cooling liquid through the parallel passes.

5. The apparatus of claim 4 wherein each of said plurality of parallel passes have extended surface elements.

6. The apparatus of claim 1 wherein said heat exchange means includes a plurality of substantially parallel tubes having fins attached thereto and interconnected to provide series flow of cooling liquid through the tubes.

7. The apparatus of claim 1 wherein said metering means includes baffle means constructed and arranged to provide a restricted cooling air port.

8. The apparatus of claim 1 wherein said restricting means includes baffle means constructed and arranged to define a restricted cooling air outlet opening downstream relative to the direction of said other path of the cooling air flow from the heat exchange means.

9. The apparatus of claim 1 wherein said restricting means functions to increase the velocity of the cooling air flow adjacent the heat exchange means.

10. The apparatus of claim 1 wherein said restricting means is located downstream relative to the direction of said other path of the cooling air flow from the heat exchange means and is constructed and arranged to have a venturi effect on the air flowing past the heat exchange means.

* * * * *